United States Patent
Nishimura et al.

(10) Patent No.: US 11,862,352 B2
(45) Date of Patent: Jan. 2, 2024

(54) CHANNEL BOX AND FUEL ASSEMBLY

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Toshiki Nishimura, Kawasaki (JP); Satoko Tajima, Yokohama (JP); Megumi Akimoto, Ota (JP); Shoko Suyama, Kawasaki (JP); Masaru Ukai, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/590,946

(22) Filed: Feb. 2, 2022

(65) Prior Publication Data
US 2022/0301730 A1 Sep. 22, 2022

(30) Foreign Application Priority Data
Mar. 18, 2021 (JP) ................................. 2021-044742

(51) Int. Cl.
*G21C 1/32* (2006.01)
*G21C 3/324* (2006.01)
*G21C 3/322* (2006.01)

(52) U.S. Cl.
CPC ............. *G21C 3/324* (2013.01); *G21C 3/322* (2013.01)

(58) Field of Classification Search
CPC ........... G21C 3/324; G21C 3/322; G21C 3/07
See application file for complete search history.

(56) References Cited

U.S. PATENT DOCUMENTS

| | | | |
|---|---|---|---|
| 5,304,261 A | 4/1994 | Yamamoto et al. | |
| 6,226,342 B1 | 5/2001 | Micko et al. | |
| 8,603,579 B2 * | 12/2013 | Takagi | C04B 41/009 428/297.1 |
| 10,878,968 B2 * | 12/2020 | Suyama | G21C 3/324 |
| 2008/0078501 A1 * | 4/2008 | Li | C04B 35/565 156/305 |
| 2009/0032178 A1 * | 2/2009 | Feinroth | C04B 35/571 156/143 |
| 2011/0268243 A1 * | 11/2011 | Hallstadius | C04B 35/62868 376/412 |
| 2017/0229195 A1 | 8/2017 | Suyama et al. | |

(Continued)

FOREIGN PATENT DOCUMENTS

| EP | 2 564 392 B1 | 6/2014 |
|---|---|---|
| EP | 3 174 063 A1 | 5/2017 |

(Continued)

*Primary Examiner* — Lily C Garner
(74) *Attorney, Agent, or Firm* — Oblon, McClelland, Maier & Neustadt, L.L.P.

(57) ABSTRACT

A channel box has a hollow elongated portion and accommodates a plurality of nuclear reactor fuel rods inside the hollow elongated portion, wherein the hollow elongated portion is constituted by a plurality types of silicon carbide composite materials. The channel box has a shape that can be achieved by applying the silicon carbide composite material and can increase earthquake resistance and improve functions and performance as a fuel assembly.

7 Claims, 5 Drawing Sheets

(56) References Cited

U.S. PATENT DOCUMENTS

| | | | | |
|---|---|---|---|---|
| 2018/0327327 A1* | 11/2018 | Suyama | .............. | C04B 41/5024 |
| 2020/0027580 A1* | 1/2020 | Deck | ........................ | C04B 35/80 |

FOREIGN PATENT DOCUMENTS

| | | | | |
|---|---|---|---|---|
| JP | 2560571 B2 | 12/1996 | | |
| JP | 2013-529298 A | 7/2013 | | |
| JP | 2015-137223 A | 7/2015 | | |
| JP | 2016-013950 A | 1/2016 | | |
| JP | 2016-024062 A | 2/2016 | | |
| JP | 6666072 B2 * | 3/2020 | | |
| JP | 7238183 B2 * | 3/2023 | ........... | B65B 7/2878 |
| WO | WO 2016/002913 A1 | 1/2016 | | |
| WO | WO-2016002914 A1 * | 1/2016 | ........... | C04B 35/565 |

* cited by examiner

CHANNEL BOX AND FUEL ASSEMBLY

CROSS-REFERENCE TO RELATED APPLICATION

This application is based upon and claims the benefit of priority from Japanese Patent Application No. 2021-044742 filed on Mar. 18, 2021, the entire content of which is incorporated herein by reference.

FIELD

Embodiments described herein relate to a channel box and a fuel assembly.

BACKGROUND

A pressurized water reactor nuclear power plant (PWR) is constituted by a circulation cycle of passing through a steam generator that is heated by a nuclear reactor, a high-pressure turbine, a low-pressure turbine, a condenser, a feed water pump, and a feed water heater in sequence and returning to the steam generator. Steam generated in the steam generator drives the high-pressure turbine and low-pressure turbine to rotate an electric generator and generate electricity.

In a boiling water reactor nuclear power plant (BWR), energy generated by a nuclear fission reaction of uranium in a nuclear reactor is used to boil cooling water, and the nuclear reactor also serves as the steam generator.

Uranium and plutonium, which are fuels of these light water reactors, are accommodated as sintered bodies (fuel pellets) in fuel cladding tubes, and to form a fuel rod. The cooling water flows around the fuel cladding tubes. A fuel assembly is constituted by a channel box disposed to cover around a plurality of fuel rods bundled together, and the cooling water flows efficiently around the fuel cladding tubes.

Generally, an Sn—Fe—Cr—Zr alloy called zircaloy-4 or an Sn—Fe—Cr—Ni—Zr alloy called zircaloy-2 is used for the channel box because of its excellent corrosion resistance and low neutron absorption cross-section, and the use of a Zr—Nb alloy or the like is also under discussion.

When these zirconium-based alloys are exposed to high temperature, such as during an accident, the following reaction with surrounding moisture occurs.

$$Zr + 2H_2O \rightarrow ZrO_2 + 2H_2 \quad (1)$$

Here, the reaction expressed in Equation (1) is an exothermic reaction, and the zirconium-based alloy accelerates an oxidation reaction in Equation (1) due to the heat generated by itself, and generation of hydrogen drastically increases at a high temperature of approximately 900° C. or higher. When the zirconium-based alloy is exposed to such a high temperature in an environment where moisture exists in the nuclear reactor, a large amount of hydrogen is generated in a short time. The hydrogen leaks out of a containment vessel, stays in a reactor building, and possibly causes hydrogen explosion. For this reason, use of a ceramic composite material that is chemically and mechanically resistant to high temperature, such as during an accident, is being considered as a material for the channel box. In particular, the use of a silicon carbide composite material, which is resistant to high temperature, is expected.

In the past, only a possibility of application of a silicon carbide composite material to a general zirconium-based alloy channel box shape in a silicon carbide composite material channel box has been presented. In addition, proposals have been made for the conventional zirconium-based alloy channel box shape regarding the channel box shape.

BRIEF DESCRIPTION OF THE DRAWINGS

FIG. 5 are each an enlarged horizontal cross-sectional diagram of a main part of the channel box and a fuel assembly according to the second embodiment illustrating a positional relationship between fuel rods and a control rod in comparison with a conventional channel box and fuel assembly, where

DETAILED DESCRIPTION

An object of the present invention is to provide a channel box and a fuel assembly having a shape that can be achieved by applying a silicon carbide composite material, which can increase earthquake resistance and improve functions and performance of the fuel assembly.

The channel box of the embodiment is a channel box having a hollow elongated portion and accommodating a plurality of nuclear reactor fuel rods inside the hollow elongated portion, wherein the hollow elongated portion is constituted by a plurality types of silicon carbide composite materials.

Hereinafter, the channel box and the fuel assembly according to the embodiment are described below with reference to the drawings. The channel box of the embodiment is constituted by using the silicon carbide composite material, and is disposed to cover the fuel rods of a boiling water reactor (BWR), and has functions of securing a reactor coolant flow path, guiding a control rod, and fixing and protecting the fuel rods. In the following description, a constitution of the channel box is mainly described, where the fuel rods are arranged in a lattice pattern in the channel box to form the fuel assembly.

First Embodiment

Figure 1:
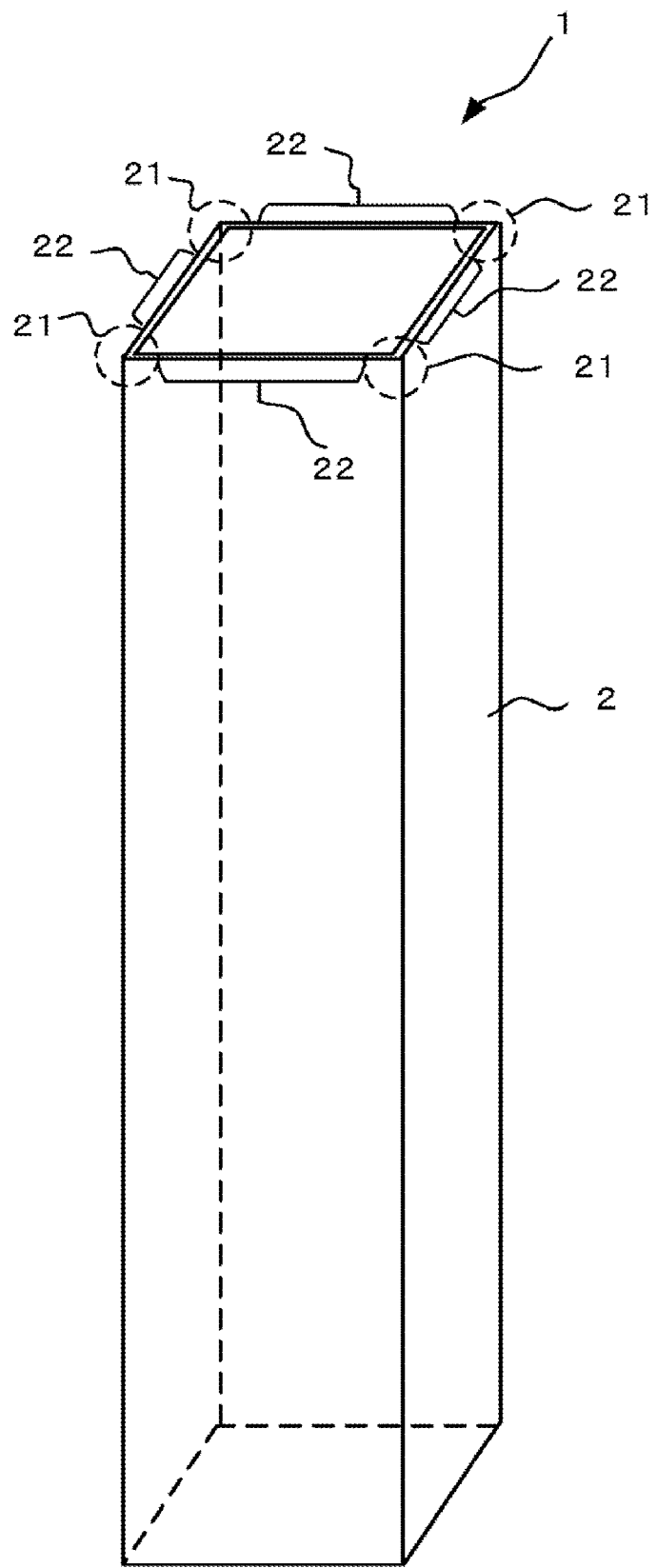
FIG. 1 is a perspective diagram schematically illustrating a schematic constitution of a channel box according to a first embodiment.

FIG. 1 is a perspective diagram illustrating a schematic constitution of a channel box 1 with a silicon carbide composite material according to a first embodiment applied. The channel box 1 has a square hollow elongated portion 2 whose overall shape is a square elongated shape. The channel box 1 also has channel box corner portions 21 located at four corners of the square hollow elongated portion 2 and channel box sides 22 located between these channel box corner portions 21.

Hereinafter, a material formed by silicon carbide fibers, an interface around the fibers, and a matrix are referred to as a silicon carbide composite material. A material formed by the matrix alone is referred to as a monolithic silicon carbide material. The channel box 1 has a laminated structure of these two materials.

Figure 2:
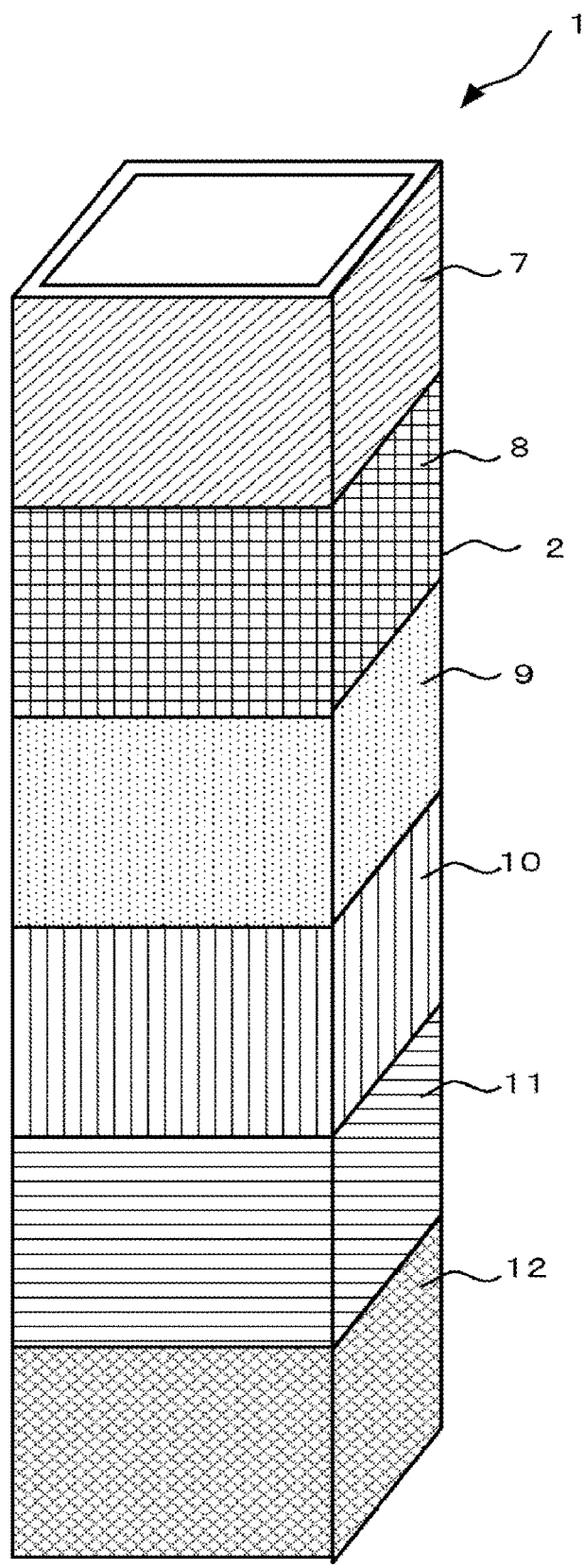
FIG. 2 is a schematic perspective diagram schematically illustrating the schematic constitution of the channel box according to the first embodiment.

FIG. 2 is a schematic perspective diagram schematically illustrating a constitution of the channel box 1 of the first embodiment. As illustrated in FIG. 2, the channel box 1 is divided into a plurality of (six in the example illustrated in FIG. 2) areas 7 to 12 in a longitudinal direction, and the silicon carbide composite material used is different from one another. The example illustrated in FIG. 2 illustrates the case where the channel box 1 is divided into six areas 7 to 12, but the number of areas may be five or less, or seven or more. The constitution of the silicon carbide composite material may be changed continuously without dividing the channel box 1 into the plurality of areas.

Figure 3:
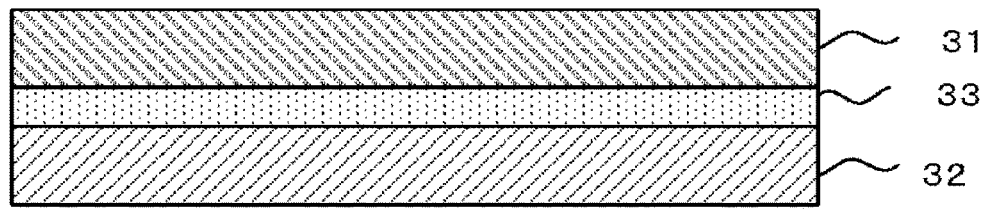
FIG. 3 is a cross-sectional diagram illustrating a constitution example of a silicon carbide composite material.

For example, a silicon carbide composite material having the constitution illustrated in FIG. 3 can be used as the silicon carbide composite material. The silicon carbide composite material illustrated in FIG. 3 has, for example, a three-layer structure made up of a first layer 31, a second layer 32, and an intermediate layer 33 interposed therebetween. The first layer 31 is made of, for example, silicon carbide. The second layer 32 is made of silicon carbide complexed with silicon carbide fibers. The intermediate layer 33 is made of a solid lubricant. Here, the first layer 31 is arranged on the outside and the second layer 32 on the inside in the channel box 1.

Since a constituent of the channel box 1 of the first embodiment is basically silicon carbide, radioactivation during use is suppressed. Further, generation of hydrogen due to a reaction with water is suppressed even if the channel box 1 comes into contact with water during a serious accident of a nuclear reactor.

Further, the channel box 1 of the first embodiment has a structure in which the intermediate layer 33, which serves as an interface that weakens a bonding force between the first layer 31 and the second layer 32, is interposed between the first layer 31 made of silicon carbide and the second layer 32 made of silicon carbide complexed with silicon carbide fibers, thereby achieving a balance among strength, fracture toughness, and fracture energy at a high level.

Concretely, the first layer 31 made of silicon carbide ensures the strength and the second layer 32 made of silicon carbide complexed with silicon carbide fibers ensures the fracture toughness and fracture energy.

In particular, the first layer 31 and the second layer 32 are functionally separated and effectively perform their functions by interposing the intermediate layer 33, which serves as the interface that weakens the bonding force, between the first layer 31 and the second layer 32. Thus, the first layer 31 made of silicon carbide sufficiently ensures the strength required in normal time and for vibrations during earthquakes. The second layer 32 made of silicon carbide complexed with silicon carbide fibers suppresses fracture when a load or a thermal shock exceeding a design basis is applied in a serious accident of a nuclear reactor. The silicon carbide composite material is not limited to the above-mentioned three-layer structure, but can also have the constitution of four or more layers.

The second layer 32 is made of silicon carbide complexed with silicon carbide fibers. This allows, for example, the second layer 32 to exhibit ductile fracture, and thereby progress of the fracture can be suppressed when combined with such as the first layer 31 for brittle fracture. In the second layer 32, for example, a matrix is formed by silicon carbide, and the silicon carbide fibers are arranged in the matrix of silicon carbide. The second layer 32 may have pores. Spaces between the silicon carbide fibers need not be completely filled by the matrix made of silicon carbide, as long as porosity is between 8.5 and 22.0%.

The silicon carbide fibers are usually arranged in the matrix made of silicon carbide in a form of fiber bundles of approximately 100 to 10000 fibers. In the second layer 32, such fiber bundles are preferably continuous. For example, in the second layer 32, it is preferred that an entire structure is formed of one continuous fiber bundle. In such a case, the fracture toughness and fracture energy are particularly high.

As mentioned above, the intermediate layer 33 is disposed between the first layer 31 and the second layer 32 and has the solid lubricant. The first layer 31 and the second layer 32 are functionally separated and effectively express their functions by interposing the intermediate layer 33 between the first layer 31 and the second layer 32. In addition, the interposition of the intermediate layer 33 between the first layer 31 and the second layer 32 prevents cracks generated in the first layer 31 from propagating directly to the second layer 32. As a result, the balance among the strength, fracture toughness, and fracture energy can be achieved at a higher level compared to the case where the first layer 31 and the second layer 32 are directly bonded.

Boron nitride, graphite, mica-based minerals, and the like are preferred to be used as the interface in the intermediate layer 33 that weakens the bonding force. When the intermediate layer 33 is made of these materials, the first layer 31 and the second layer 32 are functionally well separated.

In the silicon carbide composite material of the above constitution, for example, states of the strength, fracture toughness, and fracture energy can be adjusted by changing a ratio of an average thickness of the first layer 31 to an average thickness of the second layer 32. The states of the strength, fracture toughness, and fracture energy can also be adjusted by adjusting a content or the like of the silicon carbide fibers in the second layer 32.

The channel box 1 vibrates horizontally during an earthquake, but force applied by the earthquake vibration differs depending on a position of the channel box 1 in a longitudinal direction (vertical direction) and a position in a horizontal direction (perpendicular to the longitudinal direction). In the channel box 1 of the first embodiment, the channel box 1 is divided into six areas 7 to 12 in the longitudinal direction depending on horizontal stress or the like applied, for example, during an earthquake, and the silicon carbide composite material used is made different as illustrated in FIG. 2, and thereby mechanical properties (strength, fracture toughness, and fracture energy), and the like required for the position in the longitudinal direction can be provided.

For example, when a center portion in the longitudinal direction of the channel box 1 requires bending resistance and upper and lower ends require shear resistance, such mechanical properties can be achieved by decreasing the silicon carbide fiber content of the silicon carbide composite material at the center portion in the longitudinal direction and increasing the contents at the upper and lower ends in each of the areas 7 to 12. The silicon carbide fiber content can be adjusted as described above, for example, by changing the ratio of the average thickness of the first layer 31 to the average thickness of the second layer 32, adjusting the silicon carbide fiber content or the like of the second layer 32, and the like.

Contrary to the above, when the center portion in the longitudinal direction of the channel box 1 requires the shear resistance and the upper and lower ends require the bending resistance, such mechanical properties can be achieved by increasing the silicon carbide fiber content of the silicon carbide composite material at the center portion in the longitudinal direction and decreasing the contents at the upper and lower ends in each of the areas 7 to 12.

The above description describes three areas, the center portion and the upper and lower ends in the longitudinal direction of the channel box 1. However, in the example illustrated in FIG. 2, for example, the longitudinal direction of the channel box 1 is divided into six areas 7 to 12, which allows for finer adjustments to be made for each longitudinal position. For example, each neighboring area can be adjusted to have different mechanical properties.

The above description describes the case where the channel box 1 is divided into the areas 7 to 12 in the longitudinal direction, but it may also be divided into areas in the horizontal direction, or into areas in the longitudinal and horizontal directions. Furthermore, a horizontal cross-sectional shape of the channel box 1 may be changed as well as the silicon carbide fiber content of the silicon carbide composite material.

As described above, the present embodiment can provide a channel box and a fuel assembly having a shape that can be achieved by applying the silicon carbide composite material, capable of increasing earthquake resistance, and improving functions and performance of the fuel assembly.

Second Embodiment

Figure 4:
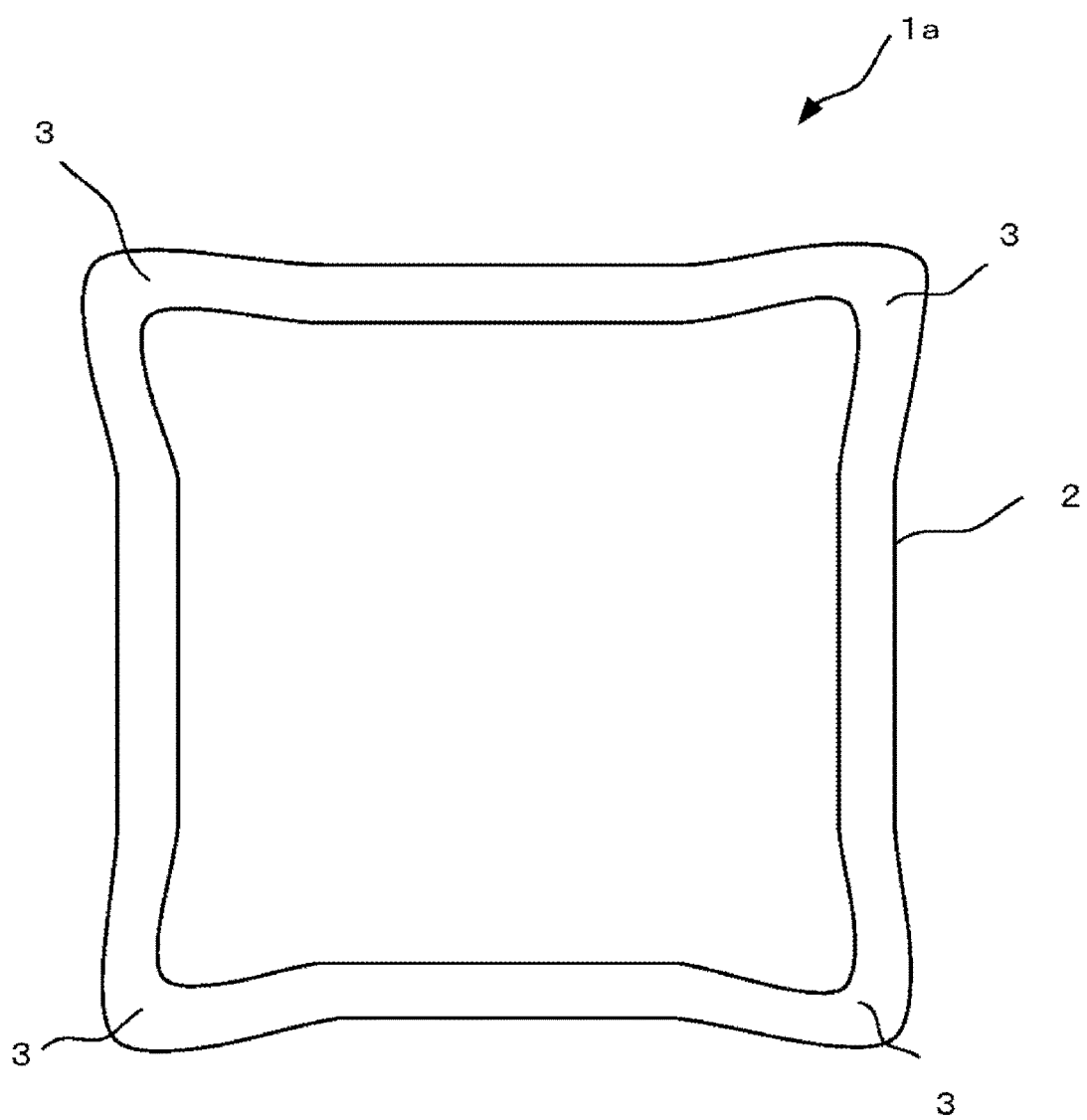
FIG. 4 is a horizontal cross-sectional diagram schematically illustrating a schematic constitution of a channel box according to a second embodiment.

Next, a second embodiment will be explained with reference to FIG. 4 and FIG. 5. In FIG. 4 and FIG. 5, the parts corresponding to the first embodiment are marked with the same signs, and redundant explanations are omitted. As illustrated in FIG. 4, a channel box 1a of the second embodiment has corner portions 3 each with an outward bulge in its horizontal cross-sectional shape. In other words, a sidewall portion of the channel box 1a has square hollow elongated shape whose corner portions each has an outwardly protruding shape.

Figure 5A:
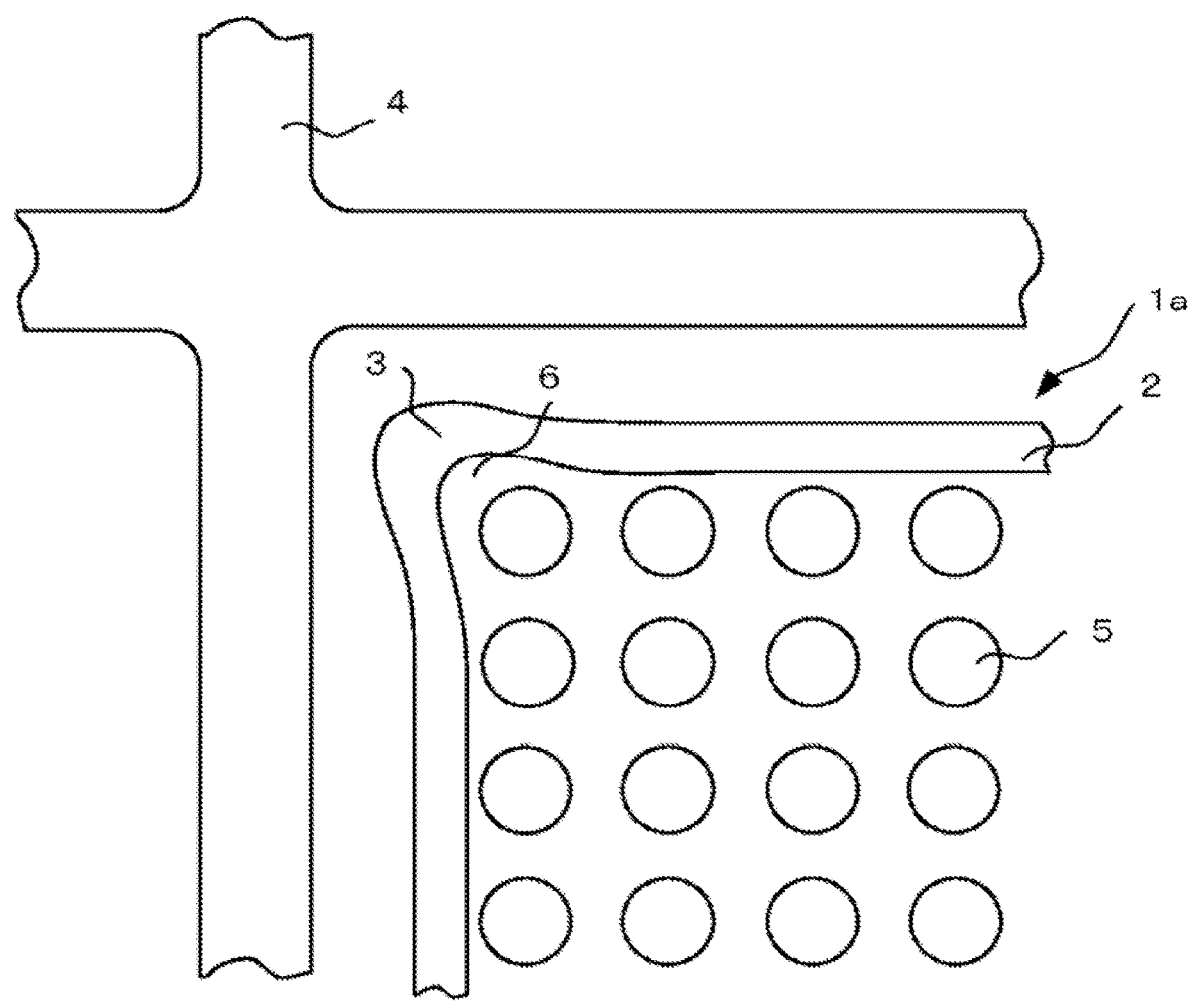
FIG. 5A illustrates the present invention and FIG. 5B illustrates a conventional example.
Figure 5B:
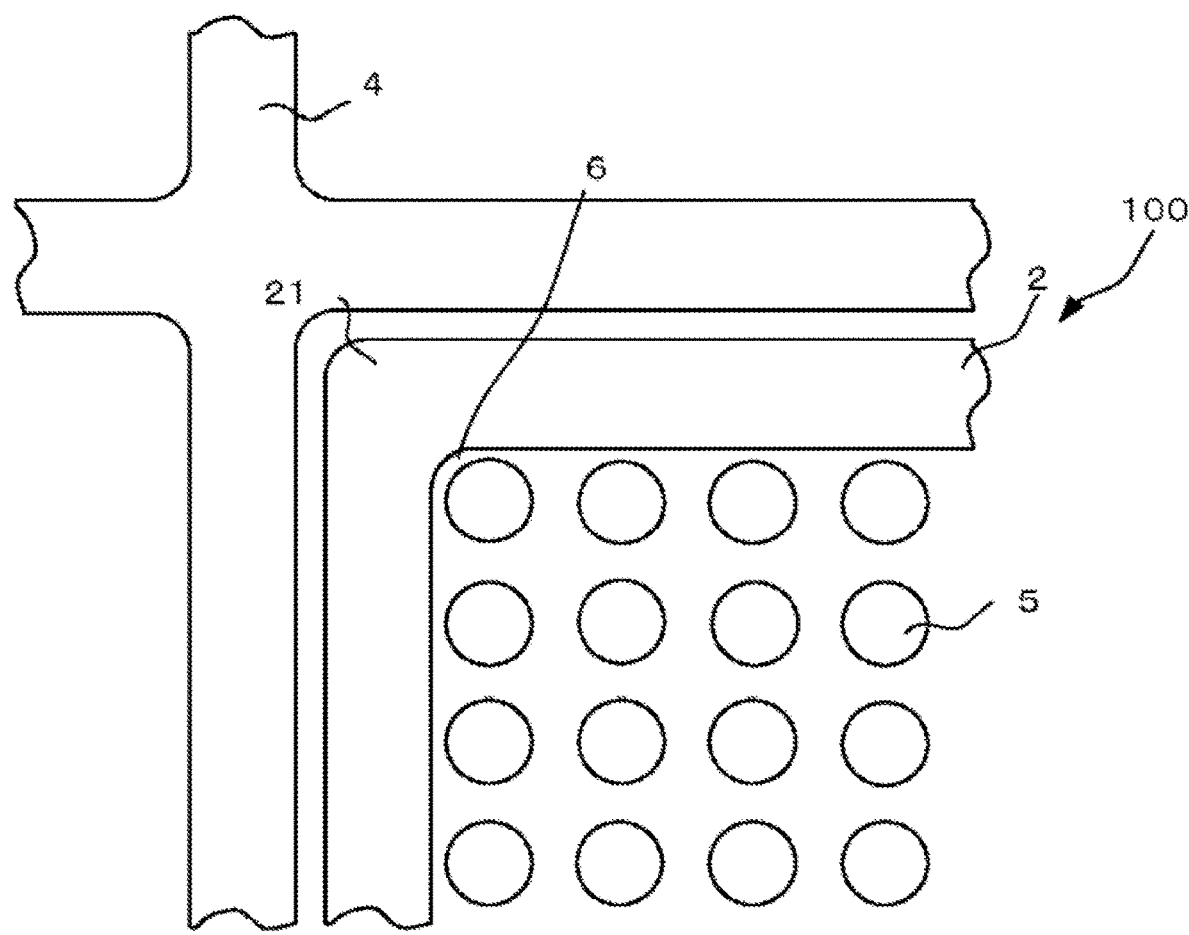

FIGS. 5A, 5B are enlarged horizontal cross-sectional diagrams of a main part illustrating a positional relationship of the channel box 1a, a control rod 4, and fuel rods 5 of the second embodiment compared with a conventional channel box 100, where FIG. 5A illustrates the case of the channel box 1a, and FIG. 5B illustrates the case of the conventional channel box 100. As illustrated in FIG. 5B, a coolant gap 6 is formed between an inner wall of the channel box corner portion 21 and the fuel rod 5 closest to the corner portion.

The channel box 1a made of the silicon carbide composite material is installed in a reactor core of a nuclear reactor while covering a plurality of fuel rods 5. Therefore, the channel box 1a has the square hollow elongated portion 2 to cover the fuel rods 5, and this shape enables the channel box 1a to secure a reactor coolant flow path inside the fuel assembly, to guide the control rod when it is inserted, and to protect the fuel assembly. Therefore, the channel box 1a has a structure having a plate thickness that satisfies these functions.

Since the silicon carbide composite material has higher strength than a zirconium alloy, a thinner plate thickness than that required for the current zirconium-based alloy channel box 100 can be used by replacing the material of the channel box from that of the current zirconium-based alloy channel box 100 to the silicon carbide composite of the channel box 1a. If the plate thickness of the channel box can be made thinner, the structure can be changed to have a curvature that allows the coolant gap 6 to be larger than before, and the corner portion 3 with a bulge on the outside of the channel box can be used. In addition, compared to the case where a plate material made of zirconium alloy is bent using a press or the like, for example, the silicon carbide composite material can be formed into any shape more easily, for example, by wrapping the material around a jig with a predetermined shape and heating it, or the like.

In FIG. 5, the difference between the plate thickness of the channel box 1a and that of the channel box 100 is exaggerated in order to make it easier to understand, but it is possible to reduce the plate thickness of the silicon carbide composite material by 20 to 30% compared to the current zirconium-based alloy channel box.

The channel box 1a of the second embodiment with the above constitution has the corner portions 3 with the outward bulge in its horizontal cross-sectional shape, which can increase the overall strength as well as the earthquake resistance as in the first embodiment. In addition, the thinning of the plate thickness increases a fuel flow path area within the same external dimensions as before. Besides, the coolant gap 6 between the inner wall of the channel box corner portion and the fuel rod 5 closest to that corner portion is 0.1 to 2 mm wider than before, for example, increasing the flow path area.

As described above, the second embodiment improves the earthquake resistance and increases the flow path area around the corner fuel rods, which have a narrow flow path area and are thermally severe in the channel box, thus improving critical power. In addition, the flow path area can be increased within the same external dimensions as before, and pressure loss design of the fuel assembly can be more flexible. Furthermore, optimized design can lead to improving channel stability, increasing of power, improving thermal tolerance, and the like. In the above second embodiment, the case where all four corner portions are the corner portions 3 each with the outward bulge. However, at least one corner portion can be the corner portion 3 with the outward bulge.

Hereinabove, while certain embodiments of the present invention have been described, these embodiments have been presented by way of example only, and are not intended to limit the scope of the inventions. These novel embodiments may be embodied in a variety of other forms, furthermore, various omissions, substitutions, and changes may be made therein without departing from the spirit of the inventions. The accompanying claims and their equivalents are intended to cover such forms or modifications as would fall within the scope and spirit of the inventions.

What is claimed is:

1. A channel box, comprising:
   an elongated portion which extends from one of two ends of the channel box in a longitudinal direction to the other of the two ends of the channel box, wherein
   the elongated portion is hollow so as to accommodate a plurality of nuclear reactor fuel rods,
   the elongated portion is divided from the one of the two ends to the other of the two ends in the longitudinal direction into at least three areas,
   each of the at least three areas (1) abuts a first other area of the at least three areas and (2) abuts a second other area of the at least three areas or one of the two ends of the channel box,
   the elongated portion has layers including a silicon carbide composite material having a silicon carbide fiber,
   a content of the silicon carbide fiber in the silicon carbide composite material used in each of the at least three areas is different from one another, and
   the content of the silicon carbide fiber in the silicon carbide composite material used in each of the at least three areas is consistent within the entirety of the respective area.

2. A channel box, comprising:
an elongated portion which extends from one of two ends of the channel box in a longitudinal direction to the other of the two ends of the channel box, wherein
the elongated portion is hollow so as to accommodate a plurality of nuclear reactor fuel rods,
the elongated portion has a square shape,
the elongated portion is divided from the one of the two ends to the other of the two ends in the longitudinal direction into at least three areas,
each of the at least three areas (1) abuts a first other area of the at least three areas and (2) abuts a second other area of the at least three areas or one of the two ends of the channel box,
the elongated portion has layers including a silicon carbide composite material having a silicon carbide fiber,
a content of the silicon carbide fiber in the silicon carbide composite material used in each of the at least three areas is different from one another,
the content of the silicon carbide fiber in the silicon carbide composite material used in each of the at least three areas is consistent within the entirety of the respective area, and
an outside and an inside of at least one corner portion of the elongated portion have an outwardly protruding shape in a horizontal cross-section of the elongated portion.

3. The channel box according to claim 1, wherein the silicon carbide composite material includes:
a first layer made of silicon carbide;
a second layer made of silicon carbide complexed with silicon carbide fibers; and
an intermediate layer interposed between the first and second layers and having a solid lubricant.

4. The channel box according to claim 1, wherein
the channel box forms a portion of a fuel assembly,
the fuel assembly includes the plurality of nuclear reactor fuel rods; and
the channel box is configured to surround an outer periphery of the plurality of nuclear reactor fuel rods.

5. The channel box according to claim 1, wherein a center portion of the elongated portion with respect to the longitudinal direction has more bending resistance than upper and lower ends with respect to the longitudinal direction and the upper and lower ends have more shear resistance than the center portion.

6. The channel box according to claim 1, wherein a center portion of the elongated portion with respect to the longitudinal direction has more shear resistance than upper and lower ends of the elongated portion with respect to the longitudinal direction and the upper and lower ends have more bending resistance than the center portion.

7. The channel box according to claim 2, wherein the outwardly protruding shape is rounded.

* * * * *